US009389717B2

(12) United States Patent
Bathiche et al.

(10) Patent No.: US 9,389,717 B2
(45) Date of Patent: Jul. 12, 2016

(54) REDUCING LATENCY IN INK RENDERING (71) Applicant: Microsoft Corporation, Redmond, WA (US)

(72) Inventors: Steven Bathiche, Kirkland, WA (US); Paul Henry Dietz, Redmond, WA (US); Hrvoje Benko, Seattle, WA (US); Andreas Georg Nowatzyk, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 13/715,779

(22) Filed: Dec. 14, 2012

(65) Prior Publication Data

US 2014/0168096 A1  Jun. 19, 2014

(51) Int. Cl.
  *G06F 3/041*  (2006.01)
  *G06F 3/147*  (2006.01)
(52) U.S. Cl.
  CPC .............. *G06F 3/0412* (2013.01); *G06F 3/147* (2013.01); *G09G 2320/02* (2013.01); *G09G 2380/14* (2013.01)
(58) Field of Classification Search
  CPC ... G06F 3/147; G06F 3/04883; G06F 3/0412; G06F 3/0416; G06F 3/03545; G06F 3/0488; G06F 17/242; G06F 3/041; G06F 17/241; G06F 3/048; G06F 3/0481; G06F 3/0484; G06F 3/04886; G06F 3/038; G06F 3/03547; G06F 9/4443; G06F 1/1643; G06F 2203/04101; G06F 2203/04104; G06F 2203/04106; G06F 17/24; G09G 3/3433; G09G 3/344; G09G 2320/02; G09G 2380/14; G06T 11/001; G06K 9/222; G06K 9/00402
  See application file for complete search history.

(56) References Cited

U.S. PATENT DOCUMENTS

| 5,566,248 | A | * | 10/1996 | Ulrich ........................... 382/187 |
| 7,120,872 | B2 | | 10/2006 | Thacker |
| 7,352,366 | B2 | | 4/2008 | Dresevic et al. |
| 7,918,396 | B2 | | 4/2011 | Gelbman |
| 2003/0214491 | A1 | * | 11/2003 | Keely et al. ................... 345/179 |

(Continued)

OTHER PUBLICATIONS

"Second Written Opinion Issued in PCT Application No. PCT/US2013/075190", Mailed Date: Jan. 20, 2015, 6 Pages.

(Continued)

*Primary Examiner* — Nalini Mummalaneni
*Assistant Examiner* — Ivelisse Martinez Quiles
(74) *Attorney, Agent, or Firm* — Steve Wight; Sandy Swain; Micky Minhas (57) ABSTRACT

A reduced-latency ink rendering system and method that reduces latency in rendering ink on a display by bypassing at least some layers of the operating system. "Ink" is any input from a user through a touchscreen device using the user's finger or a pen. Moreover, some embodiments of the system and method avoid the operating system and each central-processing unit (CPU) on a computing device when initially rendering the ink by going directly from the digitizer to the display controller. Any correction or additional processing of the rendered ink is performed after the initial rendering of the ink. Embodiments of the system and method address ink-rendering latency in software embodiments, which include techniques to bypass the typical rendering pipeline and quickly render ink on the display, and hardware embodiments, which use hardware and techniques that locally change display pixels. These embodiments can be mixed and matched in any manner.

20 Claims, 9 Drawing Sheets

(56) References Cited

U.S. PATENT DOCUMENTS

| | | | |
|---|---|---|---|
| 2004/0017375 A1* | 1/2004 | Lui et al. | 345/581 |
| 2004/0093565 A1* | 5/2004 | Bernstein et al. | 715/531 |
| 2004/0093568 A1* | 5/2004 | Lerner et al. | 715/541 |
| 2005/0088420 A1* | 4/2005 | Dodge et al. | 345/173 |
| 2005/0088464 A1 | 4/2005 | Bernstein | |
| 2006/0055685 A1* | 3/2006 | Rimas-Ribikauskas et al. | 345/179 |
| 2006/0227116 A1* | 10/2006 | Zotov et al. | 345/173 |
| 2006/0274057 A1 | 12/2006 | Van Ness et al. | |
| 2007/0067707 A1 | 3/2007 | Travis et al. | |
| 2008/0210475 A1 | 9/2008 | Silverman et al. | |
| 2009/0161958 A1* | 6/2009 | Markiewicz et al. | 382/186 |
| 2009/0226091 A1* | 9/2009 | Goldsmith et al. | 382/189 |
| 2011/0254784 A1* | 10/2011 | Yamada | 345/173 |
| 2011/0310118 A1* | 12/2011 | Asmi et al. | 345/619 |
| 2012/0062611 A1 | 3/2012 | Wang et al. | |
| 2012/0229485 A1* | 9/2012 | Rhodes et al. | 345/545 |
| 2013/0038622 A1 | 2/2013 | Yang | |
| 2013/0265239 A1* | 10/2013 | Parekh et al. | 345/173 |
| 2014/0111443 A1* | 4/2014 | Guo et al. | 345/173 |

OTHER PUBLICATIONS

"International Search Report & Written Opinion for PCT Patent Application No. PCT/US2013/075190", Mailed Date: Apr. 22, 2014, Filed Date: Dec. 13, 2013, 9 Pages.

Petzold, Charles, "The Pen is Mightier with GDI+ and the Tablet PC Real-Time Stylus", Retrieved at <<http://msdn.microsoft.com/en-us/magazine/cc300776.aspx>>, Dec. 2005, pp. 16.

"International Preliminary Report on Patentability Issued in PCT Application No. PCT/US2013/075190", Mailed Date: Apr. 16, 2015, 6 Pages.

* cited by examiner

REDUCING LATENCY IN INK RENDERING

BACKGROUND

A tablet computing device (or a similar type of embedded device) often contains a touchscreen that allows a user to enter data into the device. Data entry by the user may be done using a finger or a stylus (or pen). Input from the pen (or finger) to the device is called "ink."

Ink is digitized to allow it to be processed and manipulated by the computing device and displayed. This typically is performed by sending out the digitized ink to the operating system on the device, having the processor process the ink, and then sending the processed ink to a graphics card. The graphics card then renders the ink (which is the effect of the user's action) on a monitor or display.

One deficiency of current ink rendering techniques is the latency introduced. Pens and fingers tend to be fast and virtually instantaneous while the rendering of the ink tends to lag. In fact, the entire ink rendering process can introduce a latency that can be on the order of anywhere between 50 to 100 milliseconds or even greater. This latency in ink rendering can make for a slow and awkward user experience.

In particular, this latency is an undesirable effect in that is breaks the perceptive barrier of manipulating an object directly. Of course these are mostly perceived in situations where there is a co-located experience. In other words, when the input and the output are co-located with each other (such as writing with a stylus on a tablet computing device or a touchscreen), the latency effect is greatest.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the reduced-latency ink rendering system and method reduce latency in rendering ink by bypassing at least some layers of the operating system of a general computing device and the traditional rendering process to allow the faster appearance of ink on the display. As used herein, the term "ink" refers to input from a user that is through a touchscreen device using the user's finger or a pen. Some embodiments of the system and method can be implemented on a separate chip or co-processor that avoids the at least some layers of the operating system and one or more central-processing units (CPUs) when initially rendering the ink by going from the digitizer straight into the display controller. The rest of the process can catch up after the fact. For example, if there is any smoothing, color, or any type of correction that needs to be applied then it can be done by the operating system after the rendering of the ink. Other embodiments bypass at least some layers of the operating system but may still use the processors contained on the general computing device.

Embodiments of the system 100 and method address ink-rendering latency in two general embodiments: (1) software embodiments; and (2) hardware embodiments. It should be noted that these software embodiments and hardware embodiments can be mixed and matched in any manner to reduce ink-rendering latency.

The software embodiments use techniques that bypass at least one of the operating system, CPU, or both, when rendering ink. In embodiments where the operating system and CPUs are bypassed, the ink instead is sent directly from the digitizer to the display controller for rendering on the touchscreen display. In particular, user input is digitized by the digitizer and a determination then is made as to whether the user input contains ink. If not, then the data from the user input is sent to the operating system and rendered in the usual manner. This includes using a graphics controller and a display controller to render the data on the display.

In some embodiments the identification of ink is based on context information. This context information includes any information that can be used to help identify whether the user input is ink. This includes gestures, an interface, or a button that the user can use to identify the input as ink. Context information also includes ink regions in the digitizer that let the digitizer know that the input in these ink regions is ink. The locations of the ink regions in the digitizer are determined by the operating system and sent to the digitizer prior to receiving user input.

Whenever the user input is identified as ink, the traditional rendering process through the operating system is overridden and embodiments of the system and method are used to render the ink. If the user input does contain ink then the ink is processed by an ink rendering engine that renders the ink in a pre-determined ink style (such as color, line thickness, and font). This ink style is pre-determined by the operating system to reduce ink-rendering latency.

The embodiments of the system and method also include a vertical synchronization. Vertical synchronization synchronizes the vertical refresh rate of the display with the vertical refresh rate of the digitizer. Moreover, embodiments of the system and method also include a raster synchronization that is used to synchronize the raster lines of the display with the raster lines of the digitizer. In some embodiments these synchronizations are to a master clock. Both the vertical synchronization and the raster synchronization help to reduce any latency in rendering ink. In some embodiments latency can be reduced further by not waiting to send data to be rendered until the entire frame of the digitizer is scanned. This "just-in-time" rendering of the ink serves to further reduce latency.

The hardware embodiments of the system and method use techniques that cause an instantaneous pixel display system to locally change a display pixel without needing to go through the entire system. In other words display pixels are changed locally. In some of these techniques the means to change the display pixel is the same as is used to digitize the ink. In other techniques the means to change the pixel is different from means used to digitize the pen data.

Techniques used by the instantaneous display pixel system include light-based techniques, pressure-based techniques, heat-based techniques, mechanical deformation techniques, and magnetic techniques. Each of these techniques uses a different physical property to change the display pixels. In alternate embodiments disappearing or fading ink techniques are used. These techniques render the ink quickly but have the ink disappear or fade after a time period has elapsed. By this time the traditional rendering process has caught up and is used to replace the rendered ink. Moreover, alternate embodiments also include a "dual-port" display where the display controller is updating the display at the display frequency while any one or combination of the above-mentioned techniques is used to instantaneously change the display.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout.

DETAILED DESCRIPTION

In the following description of a reduced-latency ink rendering system and method reference is made to the accompanying drawings, which form a part thereof, and in which is shown by way of illustration a specific example whereby embodiments of the reduced-latency ink rendering system and method may be practiced. It is to be understood that other embodiments may be utilized and structural changes may be made without departing from the scope of the claimed subject matter.

I. System and Operational Overview

Embodiments of the reduced-latency ink rendering system and method offload processing of ink to a dedicated process that renders the ink on a display in a way that is much faster than going through the operating system and entire traditional rendering process. More specifically, embodiments of the system and method locally update the display at a higher frame rate than the display card or controller. Processing occurs locally and is reported to any application in use and the operating system for any additional processing and clean up.

I.A. System Overview

Figure 1:
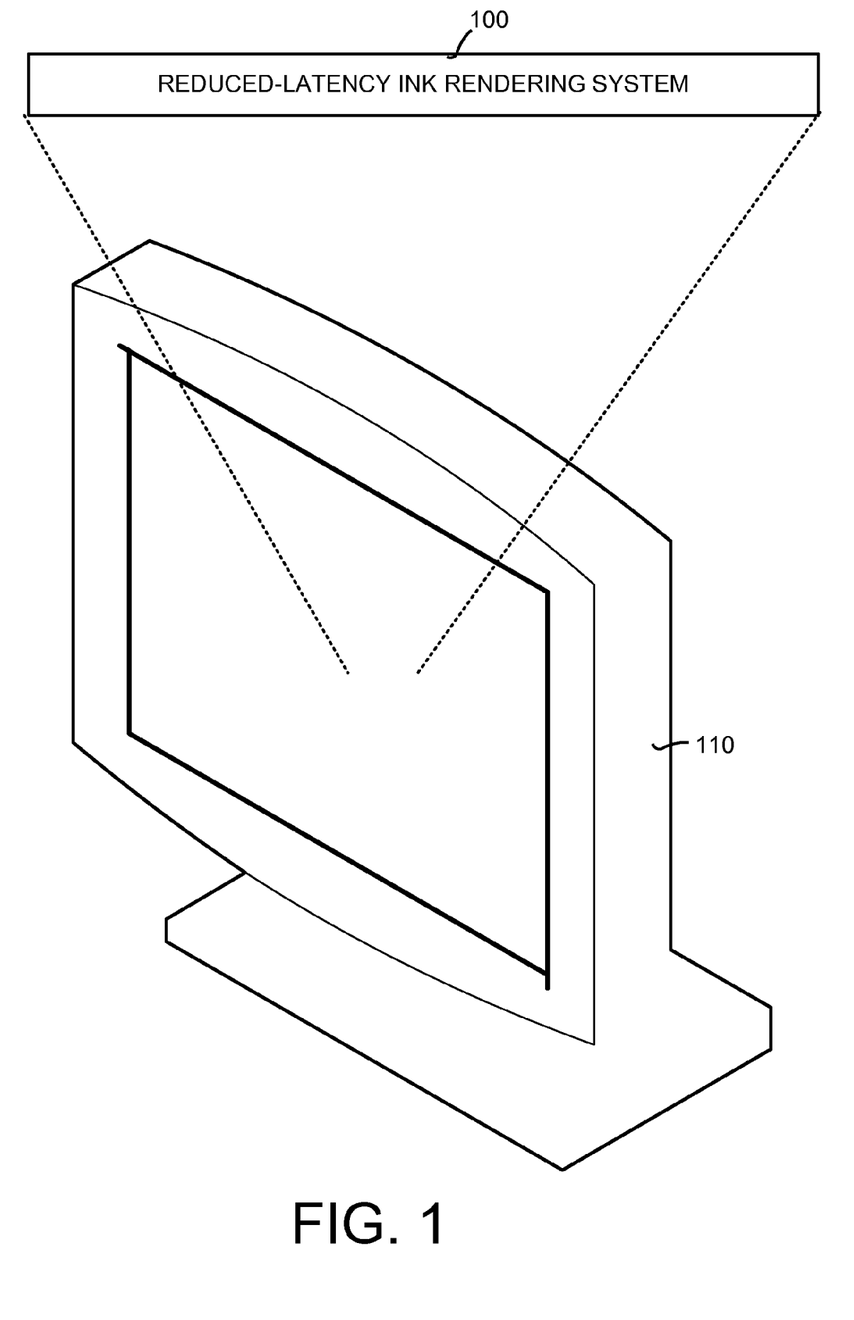
FIG. 1 is a block diagram illustrating a first exemplary implementation of embodiments of the reduced-latency ink rendering system and method.

FIG. 1 is a block diagram illustrating a first exemplary implementation of embodiments of the reduced-latency ink rendering system and method. In FIG. 1 the embodiments of the reduced-latency ink rendering system 100 are shown implemented in a touchscreen display 110. In these embodiments a user (not shown) inputs data through the touchscreen display 110 using a finger.

Figure 2:
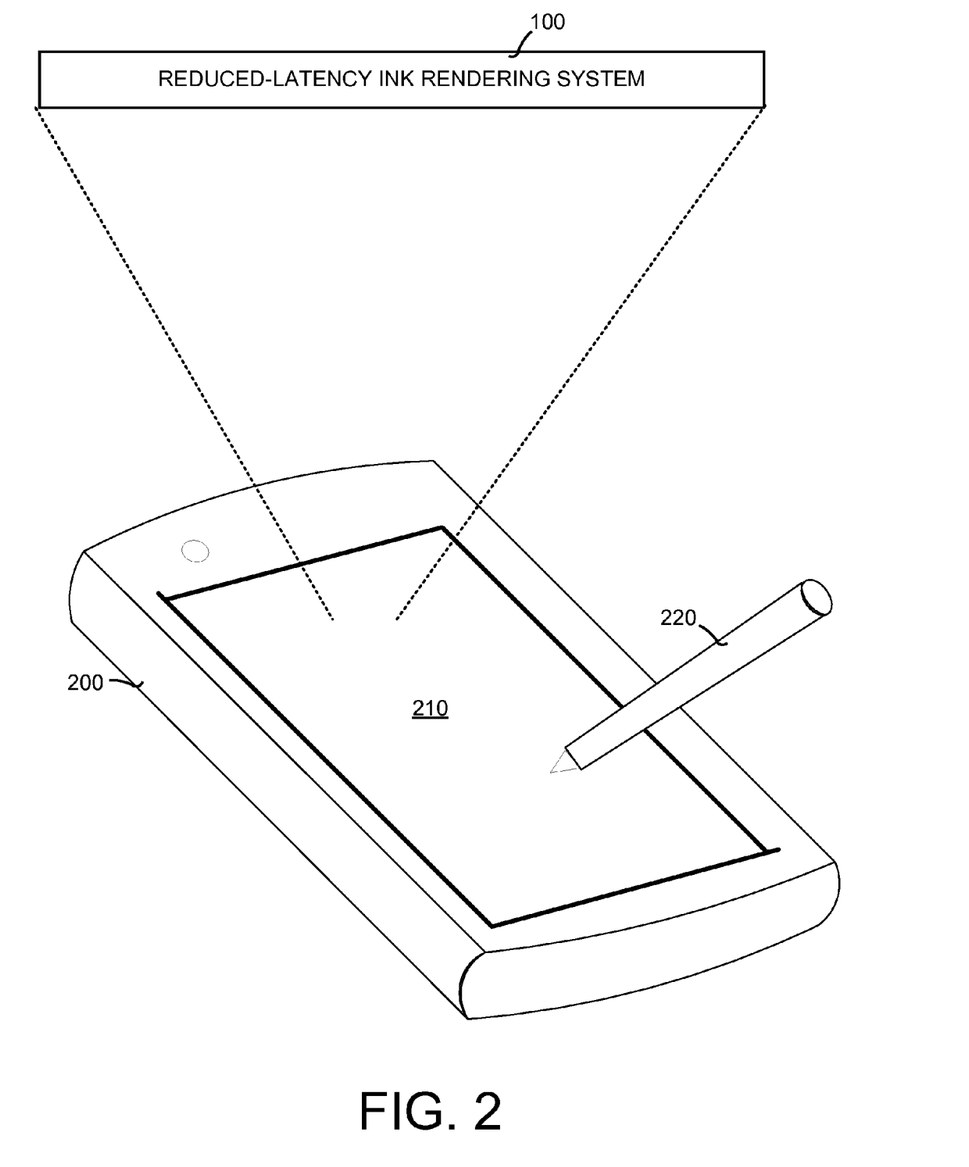
FIG. 2 is a block diagram illustrating a second exemplary implementation of embodiments of the reduced-latency ink rendering system and method.

FIG. 2 is a block diagram illustrating a second exemplary implementation of embodiments of the reduced-latency ink rendering system 100 and method. In FIG. 2 these embodiments of the reduced-latency ink rendering system 100 are shown implemented in an embedded device 200. The embedded device 200 includes a display surface 210. In these embodiments a user (not shown) inputs data through the display surface 210 using a pen 220.

I.B. Operational Overview

Figure 3:
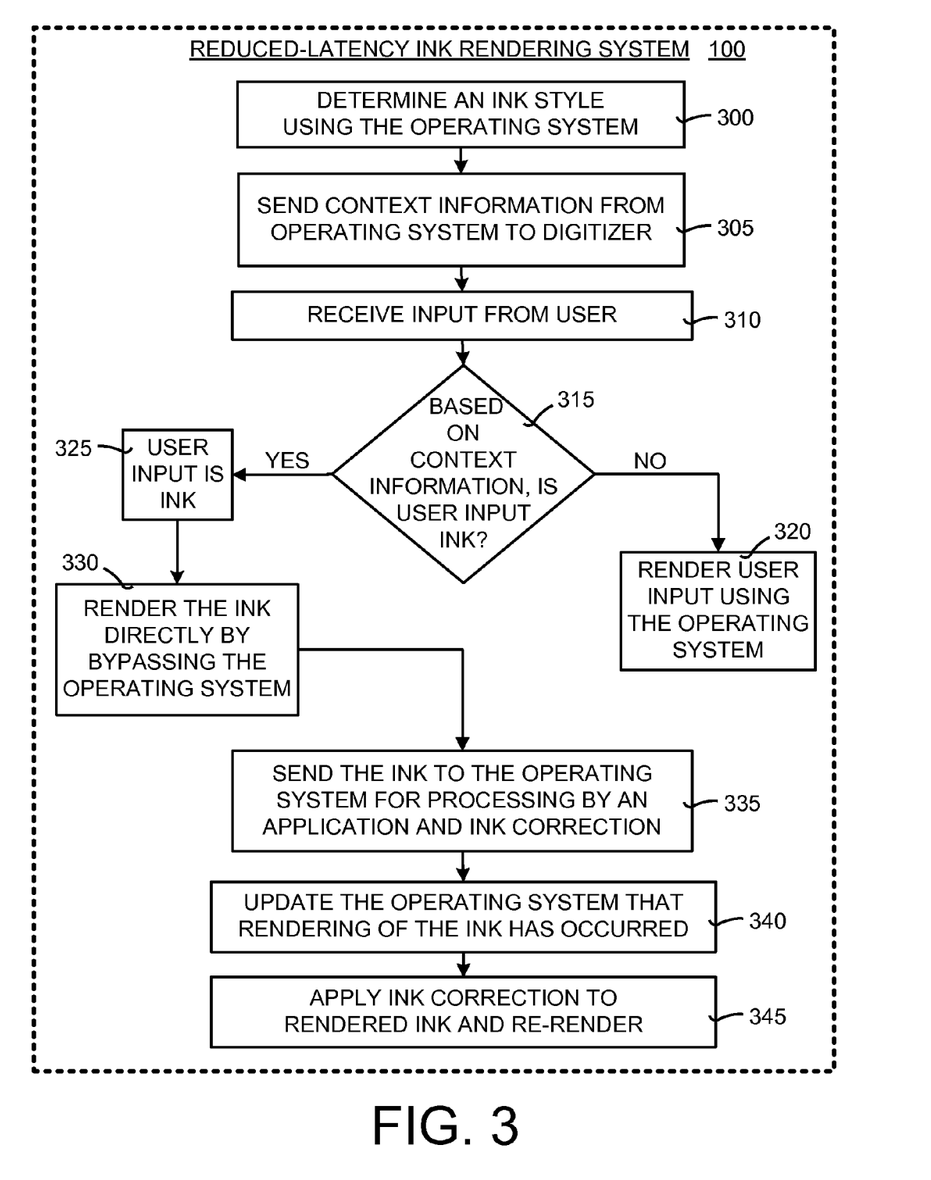
FIG. 3 is a flow diagram illustrating the general operation of embodiments of the reduced-latency ink rendering system and method shown in FIGS. 1 and 2.

FIG. 3 is a flow diagram illustrating the general operation of embodiments of the reduced-latency ink rendering system 100 and method shown in FIGS. 1 and 2. As shown in FIG. 3, the operation of the system 100 begins by determining an ink style that will be used to render the ink (box 300). As used in this application, the term "ink" refers to input from a user that is through a touchscreen device using the user's finger or a pen. This ink style is determined by the operating system of a computing device that is hosting the system 100 and method. Pre-setting the ink style in this manner before the ink is rendered serves to reduce latency in the ink rendering process.

In addition, context information is sent from the operating system to a digitizer of the system 100 and method (box 305). This context information includes any information that can be used to help the system 100 and method identify whether the user input is ink. This includes gestures, an interface, or a button that the user can use to set embodiments of the system 100 and method into motion. Whenever this occurs, the user input is identified as ink, the traditional rendering process through at least some layers of the operating system is overridden, and embodiments of the system 100 and method are used to render the ink.

Context information also includes ink regions in the digitizer that let the digitizer know that the input in these ink regions is ink. The locations of the ink regions in the digitizer are determined by the operating system and sent to the digitizer prior to receiving user input. In some embodiments the operating system informs the digitizer that a particular zone (such as an x,y rectangular window) is the ink "canvas." It should be noted that there might be more than one of these ink regions. When the user writes in these ink regions the digitizer immediately knows that the user input is ink and that it should be render quickly using embodiments of the system 100 and method. At least some layers of the operating system and traditional rendering sequence are bypassed, as explained in detail below.

The system 100 then receives input from a user (box 310). A determination then is made as to whether the user input is ink (box 315). As explained above, this determination is based on the context information. This decision as to whether the user input is ink can be made by a number of systems other than the operating system. For example, the graphics-processing unit (GPU) could make the decision. Or this functionality could be built-in to a processor in the digitizer. In addition, in some embodiments one or many processors perform this determination.

If the user input is not ink, then it is rendered using the operating system and traditional rendering techniques (box 320). If the user input is ink (box 325), then the ink is rendered directly on a display by bypassing the operating system (box 330). Once the ink has been rendered on the display, the ink is sent to the operating system for processing (such as processing by an application), for correction, or both (box 335). Embodiments of the system 100 and method also update the operating system that the rendering of the ink has occurred on the display (box 340). Any corrections in the ink or processing refinements made by the operating system then are applied to the rendered ink and the ink is re-rendered (box 345).

II. Exemplary Operating Environment

Before proceeding further with the operational overview and details of embodiments of the reduced-latency ink rendering system 100 and method, a discussion will now be presented of an exemplary operating environment in which embodiments of the reduced-latency ink rendering system 100 and method may operate. Embodiments of the reduced-latency ink rendering system 100 and method described herein are operational within numerous types of general purpose or special purpose computing system environments or configurations.

Figure 4:
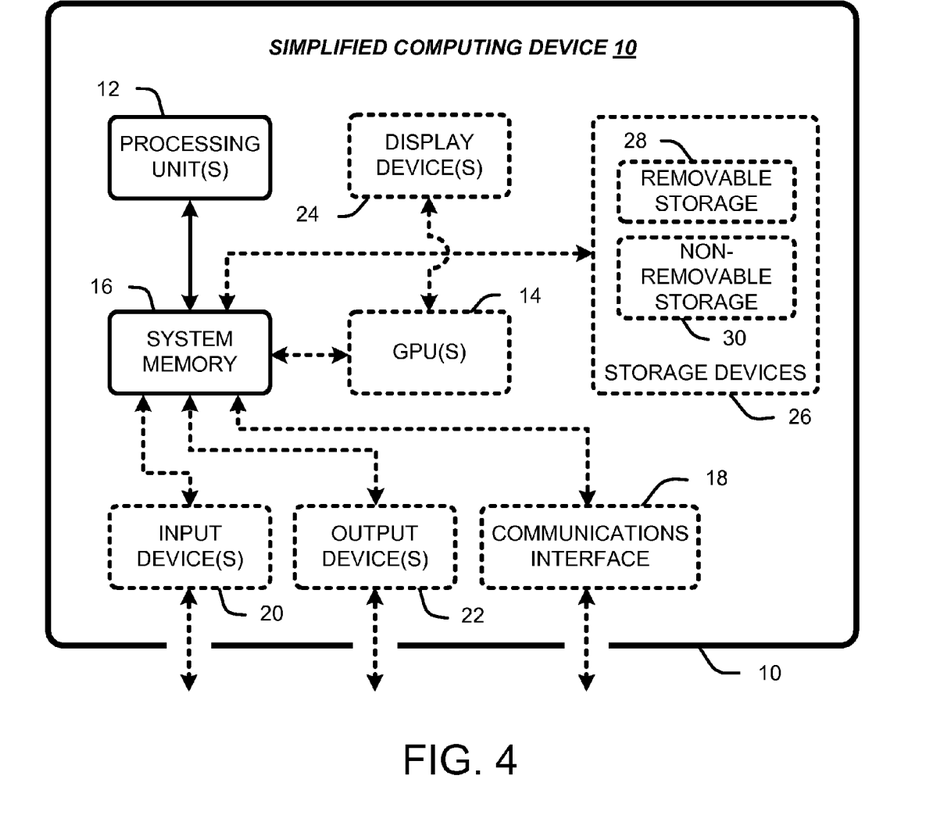
FIG. 4 illustrates a simplified example of a general-purpose computer system on which various embodiments and elements of the reduced-latency ink rendering system and method, as described herein and shown in FIGS. 1-3 and 5-9, may be implemented.

FIG. 4 illustrates a simplified example of a general-purpose computer system on which various embodiments and elements of the reduced-latency ink rendering system 100 and method, as described herein and shown in FIGS. 1-3 and 5-9, may be implemented. It should be noted that any boxes that are represented by broken or dashed lines in FIG. 4 represent alternate embodiments of the simplified computing device, and that any or all of these alternate embodiments, as described below, may be used in combination with other alternate embodiments that are described throughout this document.

For example, FIG. 4 shows a general system diagram showing a simplified computing device 10. The simplified computing device 10 may be a simplified version of computing device shown in the accompanying figures. Such computing devices can typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement embodiments of the reduced-latency ink rendering system 100 and method described herein, the device should have a sufficient computational capability and system memory to enable basic computational operations. In particular, as illustrated by FIG. 4, the computational capability is generally illustrated by one or more processing unit(s) 12, and may also include one or more GPUs 14, either or both in communication with system memory 16. Note that the processing unit(s) 12 of the general computing device may be specialized microprocessors, such as a DSP, a VLIW, or other micro-controller, or can be conventional CPUs having one or more processing cores, including specialized GPU-based cores in a multi-core CPU.

In addition, the simplified computing device 10 of FIG. 4 may also include other components, such as, for example, a communications interface 18. The simplified computing device 10 of FIG. 4 may also include one or more conventional computer input devices 20 (such as styli, pointing devices, keyboards, audio input devices, video input devices, haptic input devices, devices for receiving wired or wireless data transmissions, etc.). The simplified computing device 10 of FIG. 4 may also include other optional components, such as, for example, one or more conventional computer output devices 22 (e.g., display device(s) 24, audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device 10 of FIG. 4 may also include a variety of computer readable media. Computer readable media can be any available media that can be accessed by the simplified computing device 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the reduced-latency ink rendering system 100 and method described herein, or portions thereof, may be stored, received, transmitted, or read from any desired combination of computer or machine readable media or storage devices and communication media in the form of computer executable instructions or other data structures.

Finally, embodiments of the reduced-latency ink rendering system 100 and method described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

III. System and Operational Details

The operational details of embodiments of the reduced-latency ink rendering system 100 and method will now be discussed. Embodiments of the reduced-latency ink rendering system 100 and method address ink-rendering latency in one of two broad ways. Software embodiments bypass the typical rendering pipeline to quickly render ink on the display. Hardware embodiments use hardware and techniques that locally change display pixels. Each of these techniques will be discussed in detail below. Moreover, it should be noted that parts and pieces of these two general embodiments could be combined and mixed in any manner to fashion a new embodiment.

It should be noted that embodiments of the system 100 and method do not require an application processor (or central-processing unit (CPU)). Embodiments of the system 100 and method can run on a chip outside an application processor or operating system. Moreover, embodiments of the system 100 and method could be recorded and stored and plugged into a host at a later time. Information could be uploaded to the host for further processing.

III.A. Software Embodiments

Figure 5:
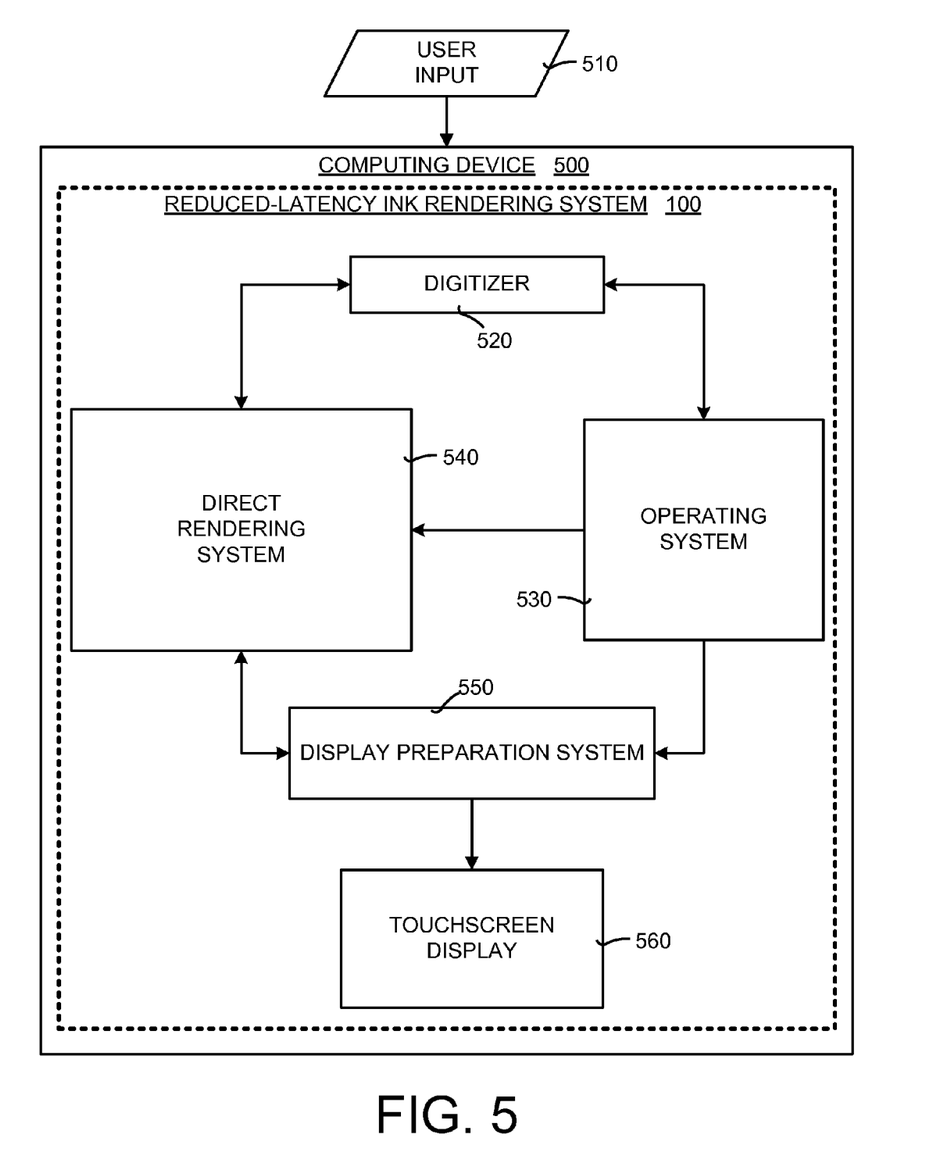
FIG. 5 is a block diagram illustrating a general overview of the software embodiments of the reduced-latency ink rendering system and method shown in FIGS. 1-3 implemented in a computing environment.

The software embodiments of the reduced-latency ink rendering system 100 and method will now be discussed. FIG. 5 is a block diagram illustrating a general overview of the software embodiments of the reduced-latency ink rendering system 100 and method shown in FIGS. 1-3 implemented in a computing environment. It should be noted that the flow of embodiments of the system 100 and method is done in a parallel manner instead of a serial manner.

As shown in FIG. 5, the software embodiments of the reduced-latency ink rendering system 100 are implemented on a computing device 500. User input 510 is entered by the user (not shown) and then is digitized by a digitizer 520. The digitizer 520 is in communication with an operating system 530 and a direct rendering system 540.

The operating system 530 also is in communication with the direct rendering system 540 and supplies data to the system 540, as described below. The operating system 530 also is in communication with a display preparation system 550 that prepares the user input 510 for rendering and subsequent display. The display preparation system 550 and the direct rendering system 540 are in communication with each other to facilitate the rendering of ink data. The user input 510 is ultimately displayed on a touchscreen display 550.

Figure 6:
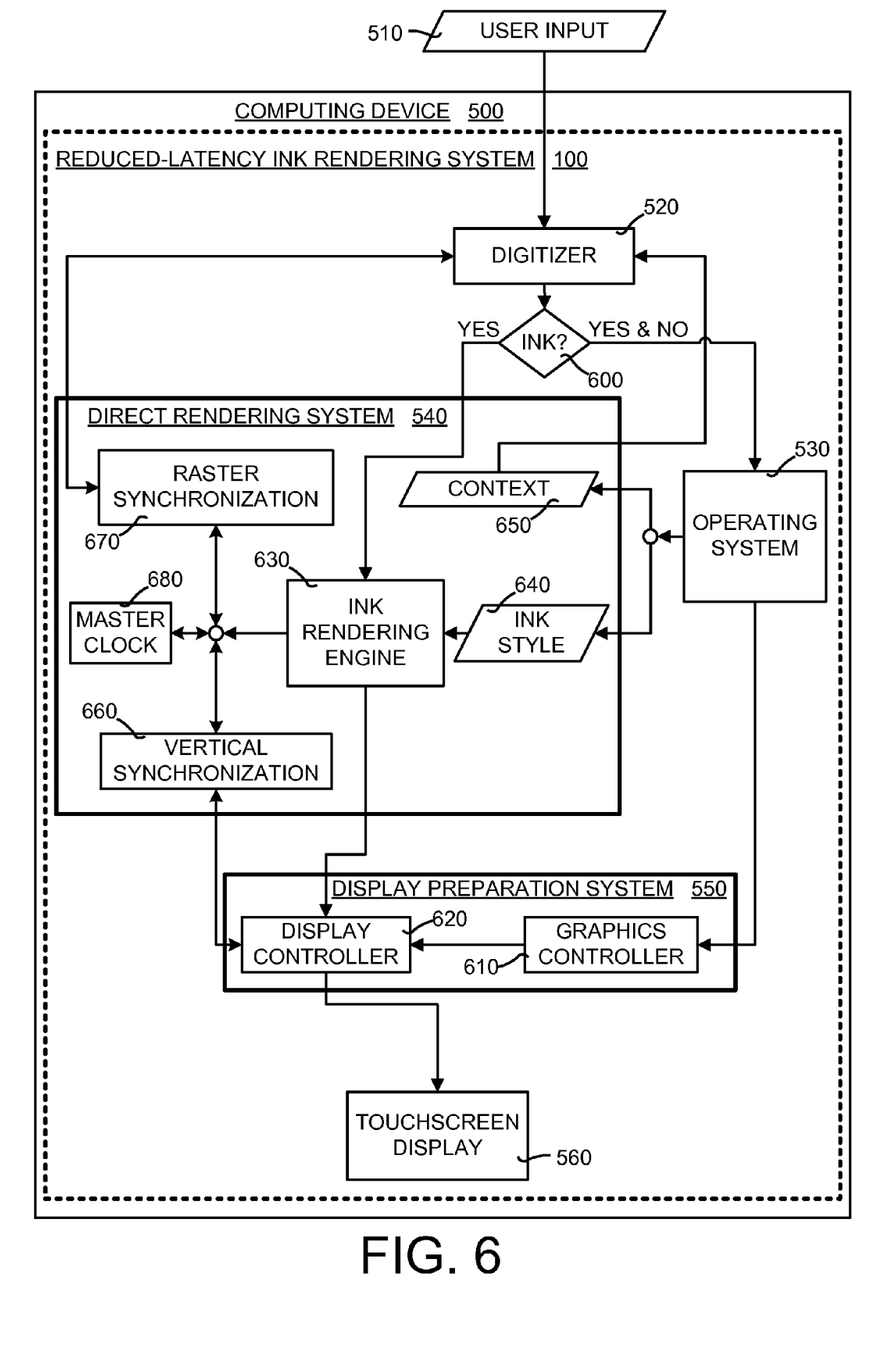
FIG. 6 is a block diagram illustrating the details of the software embodiments of the reduced-latency ink rendering system and method shown in FIG. 5.

FIG. 6 is a block diagram illustrating the details of the software embodiments of the reduced-latency ink rendering system 100 and method shown in FIG. 5. As shown in FIG. 6, the user input 510 is input to the computing device 560. Specifically, the user input 510 is processed by the digitizer 520 to create digital data from the user input 510.

A determination then is made as to whether the user input 510 contains ink 600. If not, then the user input 510 is passed to the operating system 530 that processes the data in the usual manner. This means that the user input 510 is rendered in a traditional manner using the operating system 530 and the display preparation system 550. This includes using a graphics controller 610 and a display controller 620 to process the user input 510 to be rendered. The user input 510 then is rendered on the touchscreen display 560.

If the user input 510 does contain ink, then the ink is processed by an ink rendering engine 630. The ink rendering engine 630 places the ink into a certain ink style 640 that has been previously obtained from the operating system 530. This ink style can include, by way of example, color, line thickness, and font. In some embodiments this ink style 640 is preset such that the ink rendering engine 630 has the ink style 640 immediately at its disposal when processing the ink. The ink rendering engine 630 sends the ink in the ink style 640 to the display controller 620 that in turn renders the ink on the touchscreen display 560.

The operating system 530 also defines context information 650 as to which part of the touchscreen display 560 is defined as an ink area. This context information 650 then is sent to the digitizer 520. By way of example and not limitation, the touchscreen display 560 may be displaying a form in which the user is completing. The user may only have to fill in certain portions of the form. The operating system 530 can define these sections as an ink region such that from the context information 650 the system 100 will know that the user input 510 is ink.

The embodiments of the system 100 and method also include a vertical synchronization 660. The vertical synchronization 660 synchronizes the vertical refresh rate of the touchscreen display 560 with the vertical refresh rate of the digitizer 520. Moreover, a raster synchronization 670 is used to synchronize the raster lines of the touchscreen display 560 with the raster lines of the digitizer 520. In some embodiments these are synchronized to a master clock 680. Both the vertical synchronization 660 and the raster synchronization 670 serve to reduce any latency in rendering ink on the touchscreen display 560.

Figure 7:
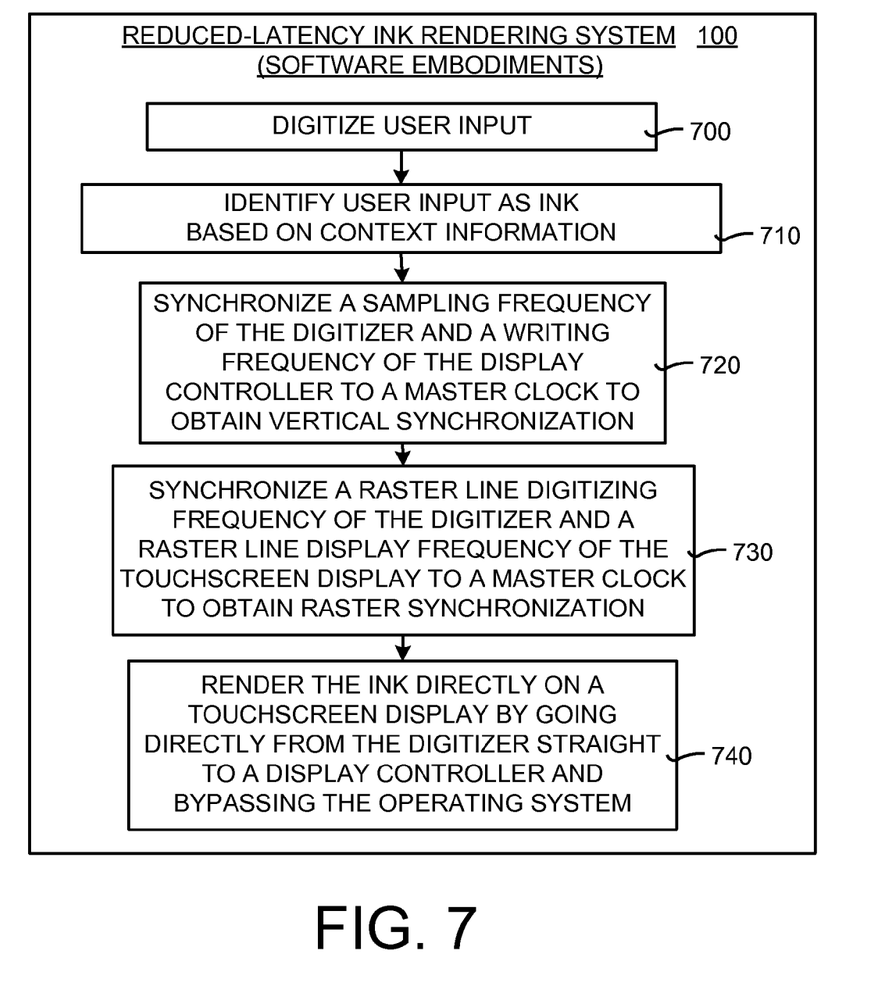
FIG. 7 is a flow diagram illustrating details of the operation of an exemplary embodiment of the software embodiments of the reduced-latency ink rendering system and method shown in FIGS. 5 and 6.

FIG. 7 is a flow diagram illustrating details of the operation of an exemplary embodiment of the software embodiments of the reduced-latency ink rendering system 100 and method shown in FIGS. 5 and 6. As shown in FIG. 7, the operation of the system 100 begins by digitizing the user input (box 700). Next, as described above, the user input is identified as ink based on the context information 650 (box 710).

One additional aspect that can reduce latency in the ink rending is the "heartbeat" of the system 100. In particular, if the digitizer 520 is sampling at a certain frequency, and the display controller 620 (or graphics card) is writing to the display at a different frequency, you have varying latency depending on the frequency of those two sampling frequencies. The idea is to have a "raster synchronization" and "vertical synchronization" in the system 100 to help the system 100 adjusts its phase so that it matches the master clock 680. This master clock can be obtained from the touchscreen display 560 or the operating system 530. These synchronization techniques serve to reduce the ink-rendering latency.

As shown in FIG. 7, the operation continues by synchronizing a sampling frequency of the digitizer 520 and a writing frequency of the display controller 620 to the master clock 680 (box 720). This helps to obtain the vertical synchronization. In addition, the system 100 synchronizes a raster line digitizing frequency of the digitizer 520 and a raster line display frequency of the touchscreen display 560 to the master clock 680 (box 730). This helps to obtain the raster synchronization.

Embodiments of the system 100 and method then render the ink on the touchscreen display 560 by going directly from the digitizer 520 straight to the display controller 620 (box 740). In other words the operating system 530 is bypassed during the rendering of the ink.

In some embodiments latency can be reduced further by not waiting to send the rendering data to the touchscreen display 560 until the entire frame of the digitizer is scanned. Specifically, the touchscreen display 560 typically writes from the upper left-hand corner from left to right and then down. This entire sequence may take on average about 16 milliseconds. However, embodiments of the system 100 and method doe not have to wait or to buffer the whole frame before writing to the touchscreen display 560. In some embodiments the raster is written inline such that as a line is being written additional data for the next line is coming in. This "just-in-time" rendering of the ink serve to further reduce latency.

III.B. Hardware Embodiments

The hardware embodiments of the reduced-latency ink rendering system 100 and method will now be discussed. These hardware embodiments include hardware and techniques that will locally change the display or the pixel at user input without the need to go through the operating system to initially render the ink. This reduces any ink-rendering latency.

Figure 8:
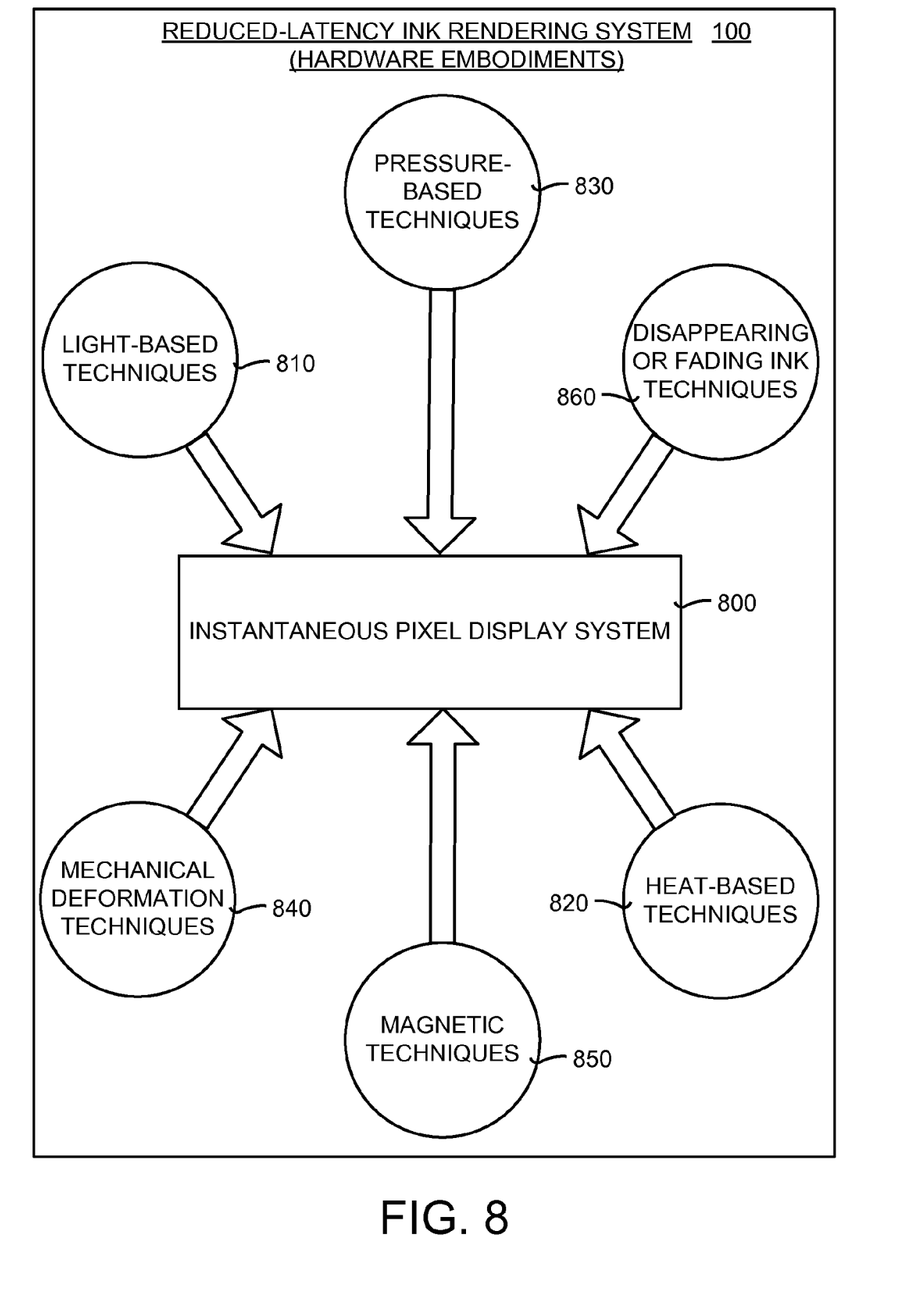
FIG. 8 is a block diagram illustrating a general overview of the hardware embodiments of the reduced-latency ink rendering system and method shown in FIGS. 1-3.

FIG. 8 is a block diagram illustrating a general overview of the hardware embodiments of the reduced-latency ink rendering system 100 and method shown in FIGS. 1-3. As shown in FIG. 8, these embodiments include an instantaneous pixel display system 800. This system 800 is piece of hardware that can use various techniques to locally change pixels on the touchscreen display 560.

Quick and local updates that are made extremely fast by circumventing and bypassing the slower sub-systems. This gives virtually instantaneous initial feedback to the user followed by modified rendering of the ink that involves a slower sub-system. Several techniques may be used to change the pixel. In some embodiments the techniques discussed below use the same means to change the display pixel and to digitize the ink. In other embodiments the means to change the display pixel is different from the pen data. By way of example, pressure from the pen may change the display pixel but capacitive or inductive means may be used to transduce the absolute position for the pen data to the computing device 500.

One set of techniques that can be used in the instantaneous pixel display system 800 is light-based techniques 810. In general, these light-based techniques use a light from the pen to change the display pixel. A photo-sensitive material is used on the display surface of the touchscreen display 560 such that the material senses the light emitted and changes. This may be a bi-stable material that "flips" whenever light is applied to the display surface. In other embodiments the display surface may have a backlight and the pen is a static pen having a reflector. The backlight is reflected by the pen back onto the display surface thereby causing the display pixel to change.

Moreover, in some embodiments of the light-based techniques 810 if the light intensity exceeds a certain threshold a bit is flipped and the display pixel undergoes a state change to a different color. Moreover, in some embodiments a material is used for the display surface that absorbs a certain frequency of light and then reemits it at a different frequency.

Another set of techniques used in the system 800 is heat-based techniques 820. In these techniques heat emitted from the pen is used to change a display pixel. In some embodiments this can be an active heat source on the pen that is emitting the heat. In other embodiments the user supplies the energy that is converted into heat. For example, the act of the user dragging the pen on the display surface causes heat that causes the display pixel to change.

Another set of techniques used in the system 800 is pressure-based techniques 830. In some embodiments there is a pressure sensor in every pixel on the touchscreen display 560. When the user exerts a certain pressure on the display surface the display pixel changes. Moreover, the display surface may have pressure-sensing piezo-electric materials that are used to change the display pixels.

Another set of techniques used is mechanical deformation techniques 840. These techniques change the pixel directly by changing a shape of the display surface. Moreover, another set of techniques is magnetic techniques 850. In these techniques active or passive magnets in the pen are used change the display pixel by interacting with a magnetically-sensitive display surface.

In alternate embodiments a disappearing or fading ink techniques 860 are used. In these embodiments the user writes on the touchscreen display 560 and the ink is render instantaneously but disappears or begins to fade after a predetermined time period has elapsed. The idea is that by the time the rendered ink disappears or begins to fade that the traditional rendering techniques will have caught up and are able to render the replacement ink. In some embodiments the time period is 100 milliseconds.

In alternate embodiments the touchscreen display 560 is a "dual-port" display where the display controller 620 is updating the display at the display frequency while any of the above-mentioned techniques for the hardware embodiments are used to instantaneously change the display pixel. In other words, whenever ink needs to be rendered the dual-port display facilitates single pixel local display updates that do not have to wait for the frame to update.

Figure 9:
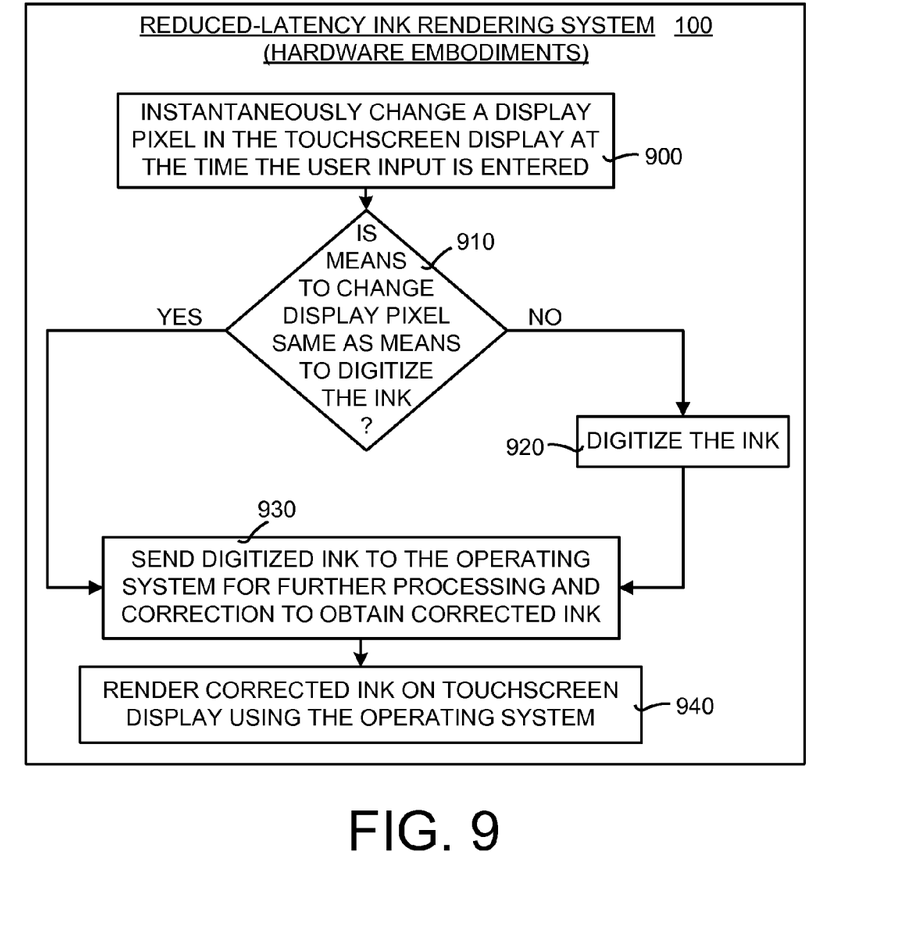
FIG. 9 is a flow diagram illustrating details of the operation of an exemplary embodiment of the hardware embodiments of the reduced-latency ink rendering system and method shown in FIG. 8.

FIG. 9 is a flow diagram illustrating details of the operation of an exemplary embodiment of the hardware embodiments of the reduced-latency ink rendering system 100 and method shown in FIG. 8. In particular, the operation begins by instantaneously changing a display pixel in the touchscreen display at the time that the user enters input (box 900). This is achieved using the instantaneous pixel display system 800 and any one or any combination of the above-mentioned techniques.

Next, a determination is made as to whether the means to change the display pixel is the same as the means used to digitize the ink (box 910). If not, then the user input is digitized using the digitizer 520 (box 920). If so, then the ink is already digitized. Either way, the digitized ink is sent to the operating system for any further processing and correction (box 930). Once this processing is done the result is corrected ink. The corrected ink is rendered on the touchscreen display 560 using the operating system 530 and traditional rendering techniques.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for rendering ink, comprising:
using a general-purpose computing device to perform the following:
receiving an input from a user;
determining whether the user input is ink based on context information;
if the user input is determined to be ink:
digitizing the ink using a digitizer;
performing just in time rendering of the ink by not waiting to buffer an entire frame of the digitizer before sending the ink;
rendering the ink directly to a display by sending the ink directly from the digitizer to a display controller and bypassing at least some layers of an operating system of the general-purpose computing device;
sending the ink to the operating system for processing after an initial rendering on the display; and updating the rendering of the ink on the display to reflect additional processing by the operating system; and
if the user input is determined to not be ink:
rendering the user input using the operating system.

2. The method of claim 1, further comprising updating the operating system that the direct rendering of the ink has occurred.

3. The method of claim 1, further comprising:
determining an ink style of the ink using the operating system; and
rendering the ink directly on the display using the ink style.

4. The method of claim 1, further comprising:
defining the context information regarding the ink using the operating system; and
sending the context information from the operating system to a digitizer.

5. The method of claim 4, further comprising:
defining regions of the display as ink regions where user input within the ink regions is ink; and
defining the ink regions as part of the context information.

6. The method of claim 5, wherein determining whether the user input is ink based on the context information comprises determining whether the user input is ink based on whether the user input is within the ink regions.

7. The method of claim 4, further comprising performing raster synchronization between the digitizer and the display to reduced latency of rendering the ink.

8. The method of claim 1, wherein determining whether the user input is ink based on context information comprises determining whether the user input is ink based on whether a button has been set to indicate the user is inputting ink.

9. A computing device comprising:
a processor; and
executable instructions operable by the processor, the executable instructions comprising a method for rendering ink, the method comprising:
receiving an input from a user;
determining whether the user input is ink based on context information;
if the user input is determined to be ink:
digitizing the ink using a digitizer;
performing just in time rendering of the ink by not waiting to buffer an entire frame of the digitizer before sending the ink;
rendering the ink directly to a display by sending the ink directly from the digitizer to a display controller and bypassing at least some layers of an operating system of the computing device;
sending the ink to the operating system for processing after an initial rendering on the display; and
updating the rendering of the ink on the display to reflect additional processing by the operating system; and
if the user input is determined to not be ink:
rendering the user input using the operating system.

10. The computing device of claim 9, wherein the method further comprises updating the operating system that the direct rendering of the ink has occurred.

11. The computing device of claim 9, wherein the method further comprises:
determining an ink style of the ink using the operating system; and
rendering the ink directly on the display using the ink style.

12. The computing device of claim 9, wherein the method further comprises:
defining the context information regarding the ink using the operating system; and
sending the context information from the operating system to a digitizer.

13. The computing device of claim 12, wherein the method further comprises:
defining regions of the display as ink regions where user input within the ink regions is ink; and
defining the ink regions as part of the context information.

14. The computing device of claim 13, wherein determining whether the user input is ink based on the context information comprises determining whether the user input is ink based on whether the user input is within the ink regions.

15. The computing device of claim 12, wherein the method further comprises performing raster synchronization between the digitizer and the display to reduced latency of rendering the ink.

16. The computing device of claim 9, wherein determining whether the user input is ink based on context information comprises determining whether the user input is ink based on whether a button has been set to indicate the user is inputting ink.

17. An apparatus comprising:
a memory storing processor-executable instructions; and
a processor operatively coupled to the memory, wherein upon execution of the processor-executable instructions, the processor:
receives an input from a user;
determines whether the user input is ink based on context information;
if the user input is determined to be ink:
digitizes the ink using a digitizer;
performs just in time rendering of the ink by not waiting to buffer an entire frame of the digitizer before sending the ink;
renders the ink directly to a display by sending the ink directly from the digitizer to a display controller and bypassing at least some layers of an operating system of the apparatus;
sends the ink to the operating system for processing after an initial rendering on the display; and
updates the rendering of the ink on the display to reflect additional processing by the operating system; and
if the user input is determined to not be ink:
renders the user input using the operating system.

18. The apparatus of claim 17, wherein the processor further:
determines an ink style of the ink using the operating system; and
renders the ink directly on the display using the ink style.

19. The apparatus of claim 17, wherein the processor further:
defines the context information regarding the ink using the operating system; and
sends the context information from the operating system to a digitizer.

20. The apparatus of claim 17, wherein the processor further:
defines regions of the display as ink regions where user input within the ink regions is ink; and
defines the ink regions as part of the context information.

* * * * *